US009142078B2

(12) United States Patent
Lin et al.

(10) Patent No.: US 9,142,078 B2
(45) Date of Patent: Sep. 22, 2015

(54) VENDING MACHINE, AND OPERATING SYSTEM AND OPERATING METHOD THEREOF

(75) Inventors: Shih-Yao Lin, New Taipei (TW); Chung-Kuan Ting, New Taipei (TW); Shih-Chi Chen, Miaoli County (TW)

(73) Assignee: Au Optronics Corporation, Hsinchu (TW)

( * ) Notice: Subject to any disclaimer, the term of this patent is extended or adjusted under 35 U.S.C. 154(b) by 56 days.

(21) Appl. No.: 13/468,038

(22) Filed: May 10, 2012

(65) Prior Publication Data

US 2013/0158703 A1 Jun. 20, 2013

(30) Foreign Application Priority Data

Dec. 20, 2011 (TW) ............................ 100147474 A

(51) Int. Cl.
*G06F 17/00* (2006.01)
*G07F 11/62* (2006.01)
*G07F 11/00* (2006.01)
*G07F 9/02* (2006.01)
*G07F 17/16* (2006.01)
*G07F 9/10* (2006.01)

(52) U.S. Cl.
CPC *G07F 9/023* (2013.01); *G07F 9/10* (2013.01); *G07F 17/16* (2013.01)

(58) Field of Classification Search
CPC .............. G07F 17/16; G07F 9/10; G07F 9/23
USPC .......................................................... 700/234
See application file for complete search history.

(56) References Cited

U.S. PATENT DOCUMENTS 5,831,862 A * 11/1998 Hetrick et al. ................ 700/232
7,299,576 B2 * 11/2007 Martin et al. .................. 40/544

(Continued)

FOREIGN PATENT DOCUMENTS

CN 201812325 U 4/2011
JP 2008197793 8/2008

(Continued)

OTHER PUBLICATIONS http://big5.ifeng.com/gate/big5/tech.ifeng.com/discovery/miracle/detail_2010_08/11/1930559_0.shtml, with English translation thereof, retrieved on May 17, 2012, "Introduction of Vending Machines with 47-inch touchscreens and Facial Recognition Technology to Japan".

(Continued)

*Primary Examiner* — Michael K Collins
(74) *Attorney, Agent, or Firm* — Jianq Chyun IP Office

(57) ABSTRACT

A vending machine, and an operating system and an operating method thereof are provided. The vending machine includes a cabinet and a transparent touch display. The cabinet accommodates a plurality of physical commodities for vending. The transparent touch display is configured in the cabinet and located in front of the physical commodities. The transparent touch display has a transparent area for revealing the physical commodities. A user selects the physical commodities by touching a position corresponding to each of the physical commodities at the transparent area. The transparent touch display is adapted for displaying corresponding commodity information according to touch information applied by the user on the transparent touch display.

25 Claims, 4 Drawing Sheets

(56) References Cited

U.S. PATENT DOCUMENTS

| | | | | |
|---|---|---|---|---|
| 7,383,099 | B2 * | 6/2008 | Pollard et al. | 700/232 |
| 7,950,817 | B2 * | 5/2011 | Zulim et al. | 362/125 |
| 7,978,184 | B2 * | 7/2011 | Morrison | 345/173 |
| 8,082,061 | B2 * | 12/2011 | Segal et al. | 700/232 |
| 8,170,713 | B2 * | 5/2012 | Levasseur et al. | 700/232 |
| 8,283,680 | B2 * | 10/2012 | Repetto et al. | 257/88 |
| 8,417,376 | B1 * | 4/2013 | Smolen | 700/232 |
| 8,820,575 | B2 * | 9/2014 | Nicholson | 221/155 |
| 2010/0100236 | A1 * | 4/2010 | Segal et al. | 700/232 |
| 2010/0103131 | A1 * | 4/2010 | Segal et al. | 345/173 |
| 2010/0249994 | A1 * | 9/2010 | Sinclair | 700/232 |
| 2010/0258216 | A1 * | 10/2010 | Wu et al. | 148/533 |
| 2012/0258216 | A1 * | 10/2012 | Wessels | 426/231 |
| 2013/0158703 | A1 * | 6/2013 | Lin et al. | 700/232 |

FOREIGN PATENT DOCUMENTS

| | | |
|---|---|---|
| JP | 2011040017 | 2/2011 |
| TW | 439047 | 6/2001 |
| TW | 200705324 | 2/2007 |
| TW | M331710 | 5/2008 |

OTHER PUBLICATIONS

"Office Action of Taiwan Counterpart Application", issued on Feb. 19, 2014, p. 1-p. 7.

"AUO Showcases Diverse Applications and Innovative Display Technologies at Japan's FPD International 2011," Advanced Display, Nov. 2011, pp. 39-40.

"First Office Action of China Counterpart Application", issued on May 28, 2013, p. 1-p. 12.

* cited by examiner

VENDING MACHINE, AND OPERATING SYSTEM AND OPERATING METHOD THEREOF

CROSS-REFERENCE TO RELATED APPLICATION

This application claims the priority benefit of Taiwan application serial no. 100147474, filed on Dec. 20, 2011. The entirety of the above-mentioned patent application is hereby incorporated by reference herein and made a part of this specification.

BACKGROUND OF THE INVENTION

1. Field of the Invention

The present invention relates to a vending machine and an operating method thereof, and in particular to a vending machine with a transparent touch display and an operating method thereof.

2. Description of Related Art

In a current vending machine, samples or patterns of commodities for vending are placed on a commodity rack in the vending machine. Each commodity for vending has a corresponding button, and a user directly presses the corresponding button or inputs a serial number corresponding to the commodity after determining the commodity to be purchased, and then obtains the commodity after waiting for a short period of time.

The above-mentioned vending machine mainly provides a one-way purchasing service, and does not provide a man-machine operating interface for interaction between the vending machine and the user. During purchasing, the user can only see the samples or patterns of the commodities for vending without seeing the physical commodities, and can obtain the commodity only after determining the commodity and paying. Therefore, the user usually feels that the physical commodity is not as good as the sample shown in the vending machine.

With the rise of a touch panel, various public information systems such as the vending machine, a bank auto teller machine, or other human control machines all need the touch panel. However, the vending machine with the touch panel can display multimedia information through the touch panel, but still cannot provide the user with a purchasing experience of interaction with the touch panel and the physical commodity at the same time.

SUMMARY OF THE INVENTION

Accordingly, the present invention is directed to a vending machine, and an operating system and an operating method thereof, providing a user with a purchasing experience of bi-directional interaction with a transparent touch panel and a physical commodity at the same time through a touching operating manner.

The present invention provides a vending machine, which includes a cabinet and a transparent touch display. The cabinet is used to accommodate a plurality of physical commodities for vending. The transparent touch display is configured in the cabinet and located in front of the physical commodities. The transparent touch display has a transparent area for revealing the physical commodities. The user selects the physical commodities by touching a position corresponding to each of the physical commodities at the transparent area, and the transparent touch display is adapted for displaying corresponding commodity information according to touch information applied by the user on the transparent touch display.

The present invention further provides an operating system of a vending machine, in which the vending machine includes a cabinet and a transparent touch display. The cabinet is used to accommodate a plurality of physical commodities for vending, and the transparent touch display is configured in the cabinet and has a transparent area for revealing the physical commodities, thereby enabling a user to select the physical commodities by touching a position corresponding to each of the physical commodities at the transparent area. The operating system includes a control module and a database. The control module is connected to the transparent touch display, and is used for receiving touch information applied by the user on the transparent touch display. The database is connected to the control module and stores commodity information of the physical commodities. The control module is adapted for selecting corresponding commodity information from the database according to the touch information and sending the commodity information to the transparent touch display, so as to display the commodity information on the transparent touch display.

The present invention further provides an operating method of the vending machine, in which the vending machine includes a cabinet and a transparent touch display. The cabinet is used to accommodate a plurality of physical commodities for vending and has one or more commodity taking mouths. The transparent touch display is configured in the cabinet and has a transparent area for revealing the physical commodities, enabling the user to select the physical commodities by touching a position corresponding to each of the physical commodities at the transparent area. The operating method includes: first receiving touch information applied by a user on the transparent touch display, and displaying corresponding commodity information on the transparent touch display according to the touch information.

Based on the above descriptions, through the transparent touch displaying technologies, the vending machine provided by the present invention enables the user to directly see the physical commodities in the vending machine through the transparent touch panel, and moreover provides the user with a purchasing experience of bi-directional interaction with the transparent touch panel and the physical commodity at the same time.

In order to make the aforementioned features and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
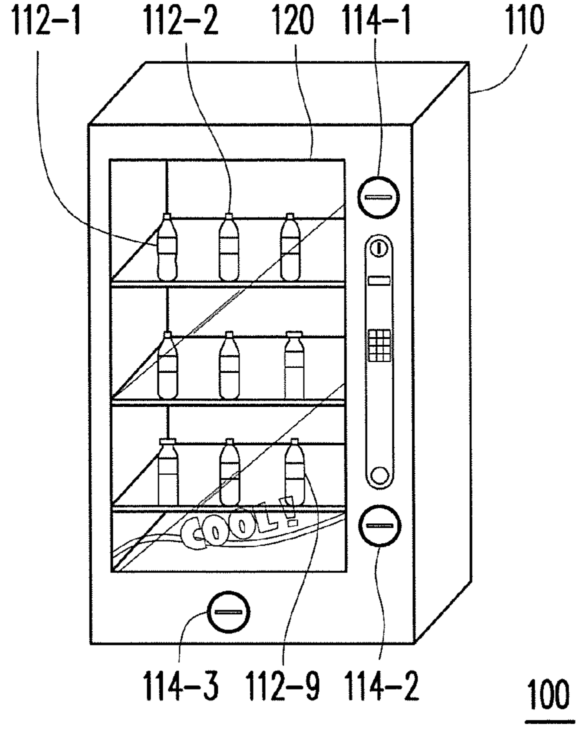
FIG. 1 is a schematic view of a vending machine according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic view of a vending machine according to an embodiment of the present invention. Referring to FIG. 1, the vending machine 100 of this embodiment includes a cabinet 110 and a transparent touch display 120. The cabinet 110 is used to accommodate a plurality of physical commodities 112 for vending, such as physical commodities 112-1, 112-2, . . . , 112-9. A physical commodity is an actual product that is sold or traded as a commodity. The physical commodities in the vending machine for vending may include, for example, candy, cookies, chips, fresh fruit, milk, cold food, coffee and other hot drinks, bottles, cans of soda, and even frozen products like ice cream, etc., and the present invention is not limited thereto. The cabinet 110 further includes a commodity taking mouth 114, and the commodity taking mouth 114 is used to output the physical commodities 112 selected by the user. The present invention does not limit the number and position of the commodity taking mouth 114 of the vending machine 100, and in this embodiment, the vending machine 100 includes, for example, three commodity taking mouths 114-1 to 114-3.

The transparent touch display 120 is configured in the cabinet 110 and located in front of the physical commodities 112. The transparent touch display 120 of this embodiment should achieve an effect that a part thereof is light transmission (the physical commodities 112 can be seen) and a part thereof displays a multimedia picture (being light proof). To achieve the above effect, each pixel of the transparent touch display 120 is designed, for example, through the following manners.

Figure 2:
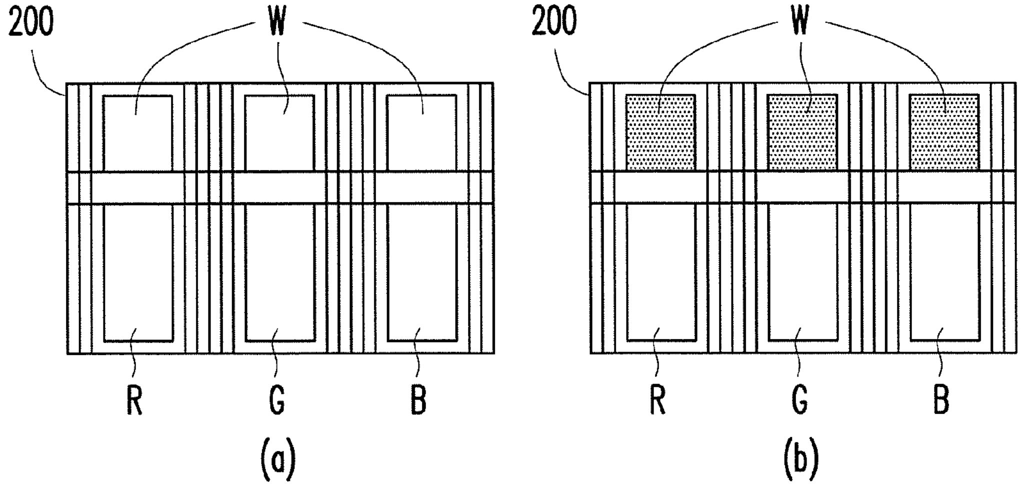
FIG. 2(*a*) and FIG. 2(*b*) are schematic views of one of pixels of a transparent touch display according to an embodiment of the present invention.

FIG. 2(*a*) and FIG. 2(*b*) are schematic views of one of pixels of a transparent touch display 120 according to an embodiment of the present invention. Referring to FIG. 2(*a*) and FIG. 2(*b*), the pixel 200 of the present invention includes a red sub-pixel R, a green sub-pixel G, and a blue sub-pixel B, and a white sub-pixel W is respectively configured on the red sub-pixel R, the green sub-pixel G, and the blue sub-pixel B. Therefore, when the sub-pixels R, G, B and W are all driven at a gray-scale value 255 (as shown in FIG. 2(*a*)), a high transmission rate may be obtained. When the sub-pixels R, G, B and W are properly driven according to requirements on the displayed pictures, and the white sub-pixel W is driven at the gray-scale value 0, that is, the white sub-pixel W is in a completely dark state (as shown in FIG. 2(*b*)), since color saturation displayed by the sub-pixels R, G and B does not decline due to the influence of background transmission light, smoothly displayed images and pictures may be obtained.

As described above, the vending machine 100 may achieve the effect that a part thereof is light transmission (the physical commodities 112 can be seen) and a part thereof displays a multimedia picture (being light proof) through controlling the change of the gray-scale value of the white sub-pixel W of the transparent touch display 120. Therefore, when the user touches and selects one of the physical commodities 112 at the transparent area (an area revealing the physical commodities 112) of the transparent touch display 120, the transparent touch display 120 may correspondingly display the information of the commodity selected by the user outside the transparent area according to the received touch information, and continuously reveal the physical commodities 112 selected by the user at the transparent area. Therefore, through the present invention, the user can see the physical commodities 112 and the corresponding commodity information at the same time in one transparent touch display 120.

Figure 3:
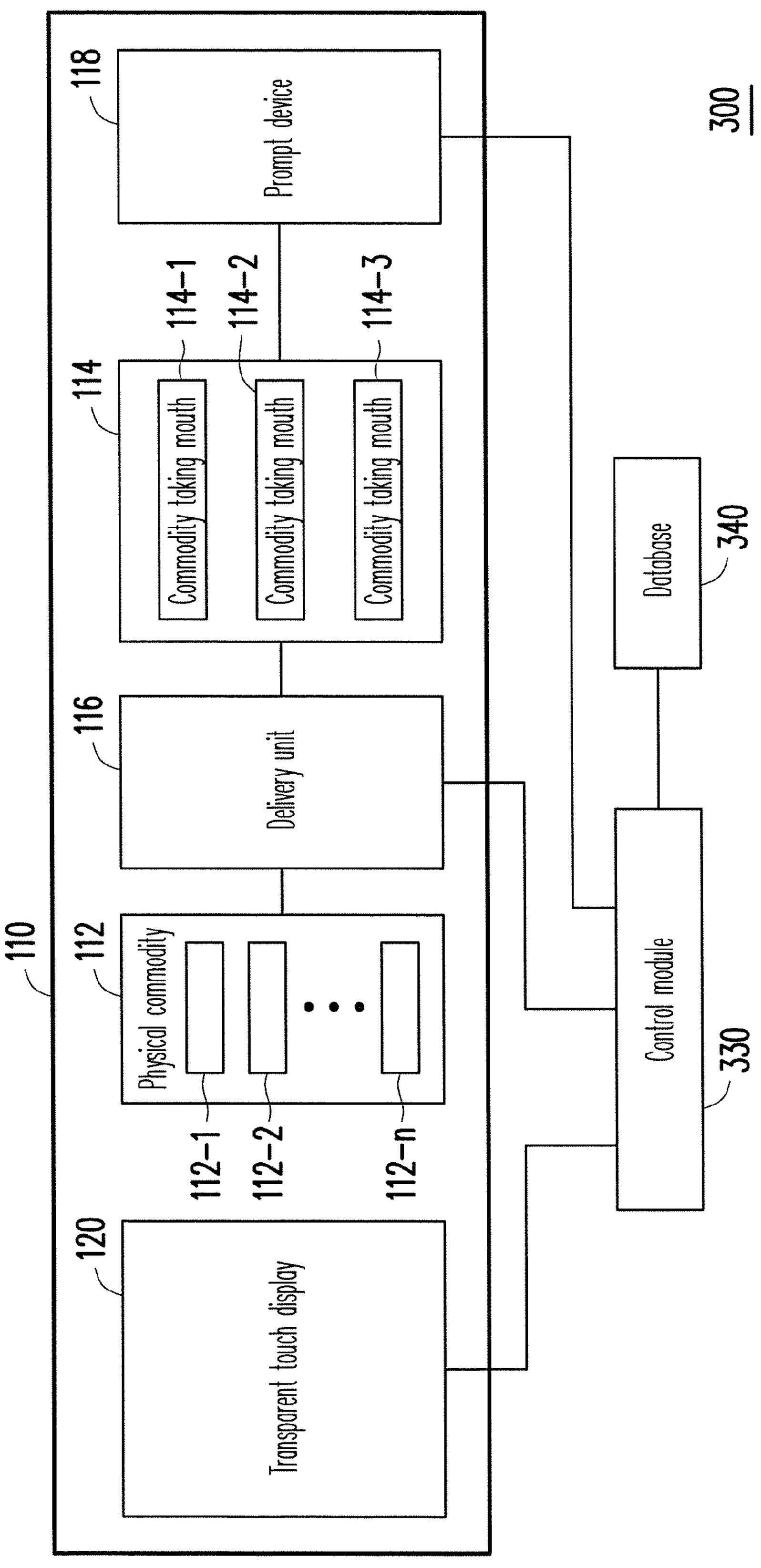
FIG. 3 is a functional block diagram of a vending machine according to another embodiment of the present invention.

To further illustrate a detailed operating manner of interaction between the vending machine and the user, another embodiment is described in the following for illustrating the present invention. FIG. 3 is a functional block diagram of a vending machine according to another embodiment of the present invention. It should be noted that, FIG. 3 is a detailed implementation manner of the vending machine 100 of FIG. 1. Different from the embodiment shown in FIG. 1, a vending machine 300 shown in FIG. 3 further includes a control module 330 and a database 340, and the cabinet 110 further includes a delivery unit 116 and a prompt device 118, in which the cabinet 110 accommodates physical commodities 112-1, 112-2, . . . , **112-*n*** and *n* is a positive integer.

The control module 330 may be software, hardware or a combination thereof, which is not limited herein. The software is, for example, application software or a driving program. The hardware is, for example, a Central Processing Unit (CPU) or other programmable devices for a general purpose or a special purpose such as a microprocessor or a Digital Signal Processor (DSP). The control module 330 is connected to the transparent touch display 120 and the delivery unit 116, and is used to receive touch information of the transparent touch display 120 and control the delivery unit 116 delivering the selected physical commodities 112.

The delivery unit 116 is disposed in the cabinet 110. The delivery unit 116 is, for example, a robot manipulator, used for delivering the selected physical commodities 112 and moving the physical commodities 112 along a delivery track decided by the user to a designated commodity taking mouth 114. The prompt device 118 may be disposed at each commodity taking mouth 114, and is, for example, a plurality of light emitting diodes (LEDs). When the user designates the commodity taking mouth 114 through touching, the control module 330 may control the prompt device 118 at the designated commodity taking mouth 114 illuminating, so as to prompt the user.

The database 340 is connected to the control module 330, so as to store commodity information corresponding to the physical commodities 112. The commodity information may include a name, ingredients or calories, a storage life, a production date and an advertisement of the commodity, and is not limited thereto.

Figure 4:
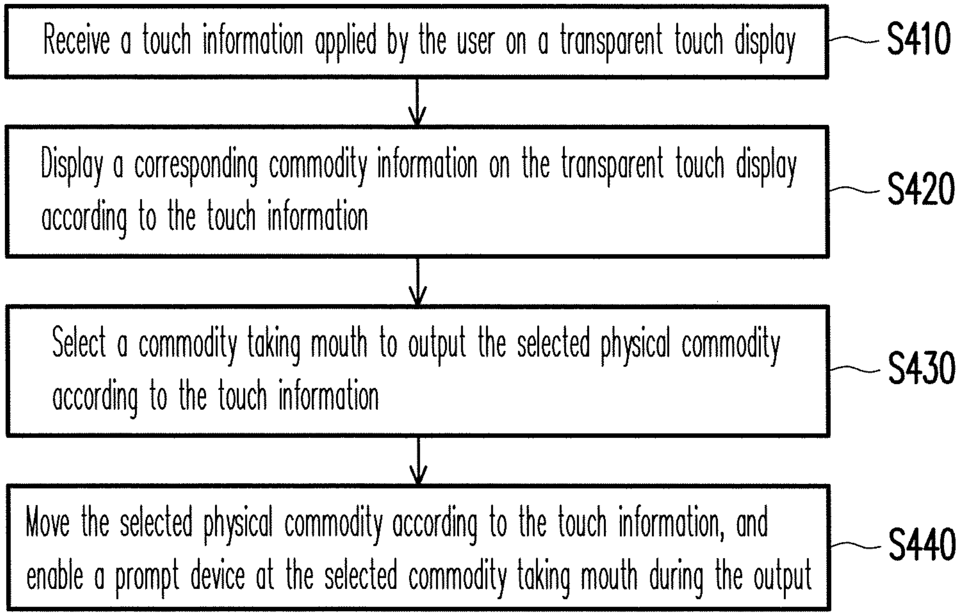
FIG. 4 is a flow chart of an operating method of a vending machine according to another embodiment of the present invention.
Figure 5:
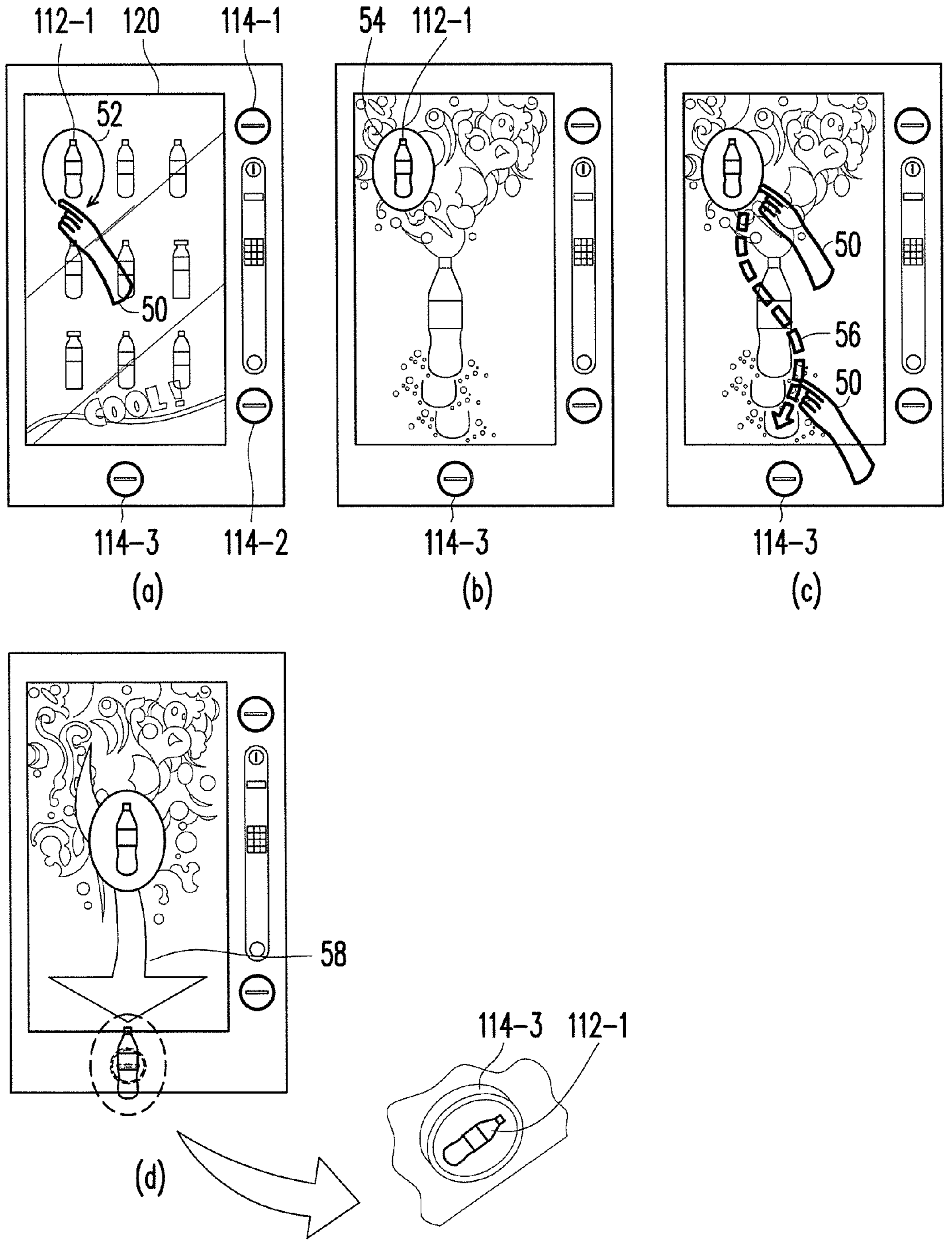
FIG. 5(*a*) to FIG. 5(*d*) are schematic views of an application scenario of an operating method of a vending machine according to another embodiment of the present invention.

FIG. 4 is a flow chart of an operating method of a vending machine according to another embodiment of the present invention, and FIG. 5(*a*) to FIG. 5(*d*) are schematic views of an application scenario of an operating method of a vending machine according to another embodiment of the present invention. Referring to FIG. 3, FIG. 4 and FIG. 5, an operating manner of the vending machine 300 is described in the following with reference to FIG. 4 and in combination with FIG. 5 that helps description.

First, it should be noted that, if the vending machine 300 is in a standby state, the commodity information of each physical commodity 112 may be used as a screensaver of the transparent touch display 120, which has an efficacy of advertisement and attracting the consumers. However, the present invention does not limit a display state of the transparent touch display 120 in the standby state, and the display state may be set by the manufacturer according to the actual requirements.

In an embodiment, if the vending machine 300 displays the screensaver in the standby state, the user may enter an operation process of purchasing the commodities through touching any point of the transparent touch display 120, and see all the physical commodities 112 at the transparent area of transparent touch display 120 at this time. In another embodiment, if the vending machine 300 further includes a motion sensing device for sensing a motion of the user and then enabling the transparent touch display 120 according to the motion of the user to enter the operation process of purchasing the commodities. For example, the motion sensing device includes an optical sensor or an acoustic sensor, or even detects the motion of an object in a space by using technologies such as structured light scanning and laser speckle. Therefore, the motion sensing device may be used to sense whether a user is close to the vending machine 300, and end the screensaver of the transparent touch display 120 when sensing that a distance between the user and the vending machine 300 is less than a preset distance, and then reveal all the physical commodities 112.

In step S410, the transparent touch display 120 receives the touch information applied by the user, and sends the touch information to the control module 330. As shown in FIG. 5(*a*), when a hand 50 of a user selects a physical commodity 112-1 to be purchased or of interest through touching on the transparent touch display 120, the transparent touch display 120 sends the received touch information to the control module 330 for judging. In this embodiment, the touch information is a designated track 52.

Then, in Step S420, the control module 330 judges the physical commodity selected by the user according to the touch information, selects commodity information corresponding to the physical commodity from the database, and sends the commodity information to the transparent touch display 120, so as to display the commodity information corresponding to the physical commodity. As shown in FIG. 5(*b*), the control module 330 judges that the user selects the physical commodity 112-1, so the transparent area 54 of the transparent touch display 120 only reveals the position of the physical commodity 112-1, and meanwhile, the transparent touch display 120 displays the corresponding commodity information outside the transparent area 54.

Afterwards, in Step S430, the control module 330 selects a commodity taking mouth to output the selected physical commodity 112-1 according to the touch information. Specifically, since the vending machine 300 of this embodiment has more than one commodity taking mouth, the user may select the commodity taking mouth outputting the physical commodity according to a height or a preference of the user. As shown in FIG. 5(*c*), the hand 50 of the user draws a delivery track 56 through touching, and the control module 330 receives the delivery track 56 and then selects the most proper commodity taking mouth to output the selected physical commodity 112-1. In this embodiment, the delivery track 56 decided by the hand 50 of the user is, for example, an S-shaped track, and the control module 330 judges that the most proper commodity taking mouth is the commodity taking mouth 114-3 according to the delivery track 56. A path of the delivery track 56 may be selected by the user, and in addition, the transparent touch display 120 may further correspondingly displays a track image of the delivery track 56.

Finally, in Step S440, the control module 330 may control the delivery unit 116 moving the selected physical commodity 112-1 according to the delivery track 56. During the output, the prompt device 118 at the selected commodity taking mouth 114-3 is enabled. As shown in FIG. 5(*d*), in the delivery process, the transparent touch display 120 may further display the transparent area 58 corresponding to the delivery track 56, and display a preset multimedia picture outside the transparent area 58. Therefore, the user can see the delivery process of the selected physical commodity 112-1 and the multimedia picture outside the transparent area 58 at the same time. It should be noted that, the delivery unit 116 is, for example, a robot manipulator. In the prior art, through the control technology, the robot manipulator can move along a three-dimensional path in the space, so as to implement, for example, the technical solutions of this embodiment, and drive the selected physical commodity to move to the commodity taking mouth along the delivery track planned by the user.

Moreover, if the prompt device 118 is LEDs or other luminescent devices, the prompt device 118 at the selected commodity taking mouth 114-3 can be enabled (that is, switched on to illuminate) to prompt the user. In addition, the prompt device 118 may further include a voice function, and prompt the user to take the commodity in cooperation with light or sound.

In summary, through the transparent touch displaying technologies, the vending machine of the present invention enables the user to directly see the physical commodities in the vending machine through the transparent touch panel, and moreover provides the user with a purchasing experience of bi-directional interaction with the transparent touch panel and the physical commodities at the same time. In addition, the motion of seeing the physical commodities, reading the corresponding commodity information and performing touching operation of the user is integrated into one transparent touch panel for execution, thus improving concentration of vision and information and facilitating the reading and purchasing of the user.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A vending machine, comprising:

a cabinet, used to accommodate multiple physical commodities for vending; and a transparent touch display, configured in the cabinet, located in front of the physical commodities and comprising a transparent area for revealing the physical commodities;

wherein the physical commodities are selected by touching a position corresponding to each of the physical commodities at the transparent area, and the transparent touch display is adapted for displaying corresponding commodity information according to touch information applied by a user on the transparent touch display, wherein an area of the transparent touch display displaying the commodity information and the transparent area are connected and are both located at a display area of the transparent touch display, wherein the touch information comprises a touch track, the touch track is decided by a movement of a hand of the user, and the transparent touch display displays a track image corresponding to the touch track, wherein the hand of the user causes the track image to move along the touch track from a beginning point to an end point of the touch track.

2. The vending machine according to claim 1, further comprising:

a control module, connected to the transparent touch display, and used for receiving the touch information applied by the user on the transparent touch display; and a database, connected to the control module and storing multiple pieces of commodity information of the physical commodities, wherein the control module is adapted for selecting corresponding commodity information from the database according to the touch information and sending the commodity information to the transparent touch display, so as to display the commodity information on the transparent touch display.

3. The vending machine according to claim 1, wherein the commodity information is displayed at a position outside the transparent area.

4. The vending machine according to claim 1, wherein the touch information comprises a selected track when the user selects the physical commodities in the transparent area.

5. The vending machine according to claim 1, further comprising a delivery unit, disposed in the cabinet and used for delivering the selected physical commodities.

6. The vending machine according to claim 5, wherein the delivery unit is connected to the control module, and the control module controls the delivery unit delivering the selected physical commodities.

7. The vending machine according to claim 5, wherein the touch information comprises a delivery track decided by the user, and the delivery unit is adapted for moving the physical commodity along the delivery track.

8. The vending machine according to claim 1, wherein the cabinet comprises multiple commodity taking mouths, and the control module is adapted for selecting one of the commodity taking mouths to output the selected physical commodity according to the touch information.

9. The vending machine according to claim 8, further comprising multiple prompt devices, respectively disposed at the commodity taking mouths, wherein when the control module is adapted for outputting the selected physical commodity, the prompt device at the selected commodity taking mouth is enabled.

10. The vending machine according to claim 2, wherein the control module further sends the touch track to the transparent touch display, so as to display the track image corresponding to the touch track.

11. The vending machine according to claim 1, further comprising a motion sensing device, used for sensing a motion of the user and enabling the transparent touch display according to the motion of the user.

12. The vending machine according to claim 1, wherein the transparent touch display is adapted for displaying corresponding commodity information in front of the physical commodities when the user touches the transparent area.

13. An operating system of a vending machine, wherein the vending machine comprises a cabinet and a transparent touch display, the cabinet is used to accommodate multiple physical commodities for vending, and the transparent touch display is configured in the cabinet, located in front of the physical commodities and comprises a transparent area for revealing the physical commodities, the physical commodities are selected by touching a position corresponding to each of the physical commodities at the transparent area; the operating system comprising:

a control module, connected to the transparent touch display, and used for receiving touch information applied by the user on the transparent touch display; and a database, connected to the control module and storing multiple pieces of commodity information of the physical commodities, wherein the control module is adapted for selecting corresponding commodity information from the database according to the touch information and sending the commodity information to the transparent touch display, so as to display the commodity information on the transparent touch display, wherein an area of the transparent touch display displaying the commodity information and the transparent area are connected and are both located at a display area of the transparent touch display, wherein the touch information comprises a touch track, the touch track is decided by a movement of a hand of the user, and the control module further sends the touch track to the transparent touch display, so as to display a track image corresponding to the touch track, wherein the hand of the user causes the track image to move along the touch track from a beginning point to an end point of the touch track.

14. The operating system of a vending machine according to claim 13, wherein the control module displays the image commodity at a position outside the transparent area.

15. The operating system of a vending machine according to claim 13, wherein the touch information comprises a selected track when the user selects the physical commodities in the transparent area.

16. The operating system of a vending machine according to claim 13, wherein the control module is adapted for controlling a delivery unit delivering the selected physical commodity.

17. The operating system of a vending machine according to claim 16, wherein the touch information comprises a delivery track decided by the user, and the delivery unit is adapted for moving the physical commodity along the delivery track.

18. The operating system of a vending machine according to claim 13, wherein the transparent touch display is adapted for displaying corresponding commodity information in front of the physical commodities when the user touches the transparent area.

19. An operating method of a vending machine, wherein the vending machine comprises a cabinet and a transparent touch display, the cabinet is used to accommodate multiple physical commodities for vending and comprises at least one commodity taking mouth, and the transparent touch display is configured in the cabinet, located in front of the physical commodities and comprises a transparent area for revealing the physical commodities, thereby enabling the user to select the physical commodities are selected by touching a position corresponding to each of the physical commodities at the transparent area; the operating method comprising:

receiving touch information applied by the user on the transparent touch display; and displaying corresponding commodity information on the transparent touch display according to the touch information, wherein an area of the transparent touch display displaying the commodity information and the transparent area are connected and are both located at a display area of the transparent touch display, wherein the touch information comprises a touch track, the touch track is decided by a movement of a hand of the user, and the operating method further comprises displaying a track image corresponding to the touch track, wherein the hand of the user causes the track image to move along the touch track from a beginning point to an end point of the touch track.

20. The operating method of a vending machine according to claim 19, wherein the commodity information is displayed at a position outside the transparent area.

21. The operating method of a vending machine according to claim 19, wherein the touch information comprises a delivery track decided by the user, and the operating method further comprises: moving the physical commodities along the delivery track.

22. The operating method of a vending machine according to claim 19, further comprising: selecting a commodity taking mouth to output the selected physical commodity according to the touch information.

23. The operating method of a vending machine according to claim 19, further comprising: enabling a prompt device at the selected commodity taking mouth when the selected physical commodity is output.

24. The operating method of a vending machine according to claim 19, further comprising: enabling the transparent touch display according to a motion of the user.

25. The operating method of a vending machine according to claim 19, wherein the transparent touch display is adapted for displaying corresponding commodity information in front of the physical commodities when the user touches the transparent area.

* * * * *